Oct. 16, 1934.  F. L. R. REURE ET AL  1,977,592
COCK FOR FLUID PRESSURE CONDUITS
Filed Nov. 5, 1932
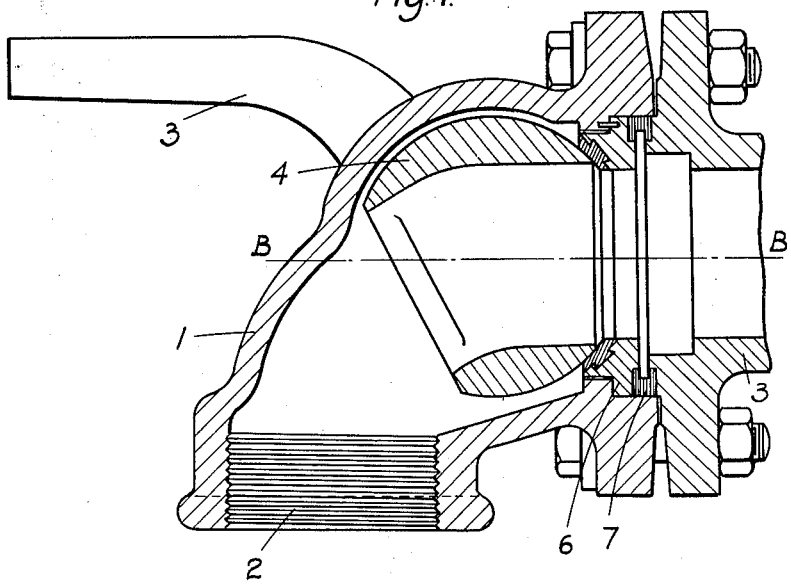
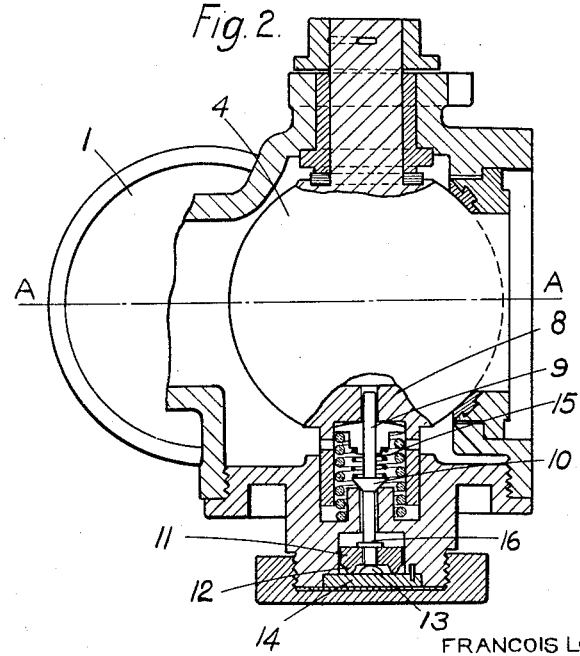
INVENTORS
FRANCOIS LOUIS RENE REURE
FRANCOIS GABRIEL MARTIN
BY
Wm. M. Cady
ATTORNEY Patented Oct. 16, 1934

1,977,592

UNITED STATES PATENT OFFICE 1,977,592

COCK FOR FLUID PRESSURE CONDUITS

François Louis René Reure, Paris, and François Gabriel Martin, Villeneuve-St.-Georges, France Application November 5, 1932, Serial No. 641,386
In France November 18, 1931

1 Claim. (Cl. 277—9)

This invention relates to cocks for fluid pressure conduits of the kind comprising a casing and a spherical rotary obturating member having an orifice therein and mounted in the casing, the obturating member being arranged to cooperate with a seat mounted within the casing so as to prevent the passage of fluid from one side to the other of the member.

One object of the invention is to provide an improved cock of this character adapted particularly for steam heating or other conduits provided on railway vehicles, although, as will be appreciated the invention is not solely limited to this application.

Many of the cocks employed at present in connection with steam conduits on railway vehicles have the disadvantage of restricting the flow of steam through the conduit, owing for instance to the relatively narrow ports provided by such cocks and the deflection of the direction of the flow of fluid therein, with the result that a fall in pressure occurs at each cock throughout a train of vehicles and lack of uniformity of the heating throughout the train follows.

In order to prevent the restriction of the flow of fluid through a cock for fluid pressure conduits the rotary obturating member of the cock has been constituted by a spherical body which is adapted to be applied in the closed position of the cock on a rubber or similar relatively soft seat, the closure of the cock being effected by the rotation of the obturating member around an axis passing through the centre of its spherical surface. However under the action of steam the rubber or other soft seat gradually disintegrates and the seating surfaces presented to the spherical body become pitted, with the result that leakage of fluid past the obturating member in its closed position may occur.

Another object of the invention is to overcome the disadvantage referred to hereinbefore by providing in the casing of the cock an annular metallic seat with which the spherical rotary obturating member is arranged to cooperate, this metallic seat being applied resiliently to the spherical rotary obturating member in the closed position of the latter so as effectively to prevent the passage of fluid from one side to the other of the said member.

A still further object of the invention is to provide in addition to the metallic seat arrangements whereby communication is automatically established in the closed position of the obturating member between the atmosphere and the casing of the cock at that side of the spherical rotary obturating member connected to the hose couplings between the vehicles of a train so that when the cock is closed the steam or other fluid contained within the hose couplings is vented to the atmosphere, so as to ensure that once the cock is closed the fluid contained within the corresponding hose coupling is vented to the atmosphere, before uncoupling.

Other objects and advantages of the present invention will be apparent from the following description with reference to the accompanying drawing of a preferred embodiment thereof.

In the drawing Figure 1 is a longitudinal section on the line A—A of Figure 2 showing the obturating member in its open position, and Figure 2 is a horizontal section taken on the line B—B of Figure 1.

Referring now to the drawing the cock comprises a casing 1 to which a rigid or flexible conduit is adapted to be secured at 2, a rigid conduit being arranged to be connected to the casing of the cock at 3.

The obturating member is constituted by a spherical body 4 adapted to be rotated by means of the handle 5 from the open position in which it is illustrated in the drawing to its closed position in which communication between opposite sides of the obturating member is effectively cut off by the application thereto of the metallic seat 6 of the obturating member. The metallic seat 6 is constantly applied to the spherical body 4 by a resilient ring 7 which is adapted to permit a small displacement of the metallic seat in the direction of its axis within the casing and assures a good contact between the spherical body 4 and the metallic seat 6.

The resilient ring 7 is substantially U-shaped as shown in Figure 1 of the drawing and the pressure of the steam or other fluid within the cock casing assists the resilient ring 7 in applying the metallic seat 6 to the spherical body 4.

When the spherical body 4 is rotated by means of the handle 5 to its closed position it rotates a stem 9 of a valve 10 (Figure 2) which stem carries a disc 11 having two projections 12 thereon diametrically opposite to one another; the stem 9 of the valve 10 enters an aperture provided in the hollow bearing portion 8 of the spherical body 4.

The projections 12 serve as cams and cooperate with corresponding cam surfaces 13 carried by a fixed disc 14. Normally, that is to say when the spherical body 4 is in its open position as illustrated in the drawing the valve 10 is applied to its seat by means of a spring 15, but when the spherical body is rotated to its closed position by means of the handle 5 the projections 12 cooperating with the cam surfaces 13 cause the valve stem 9 to rise against the action of the spring 15 and permit the escape of fluid from the interior of the casing 1 of the cock at the left hand side of the spherical body 4 to the atmosphere past the valve seat and through an orifice 16.

It will be evident that the invention is not limited to the particular construction and arrangement of the parts hereinbefore described which may be varied as desired to suit particular requirements without exceeding the scope of the invention.

Having now described our invention, what we claim as new and desire to secure by Letters Patent is:

In a cock for fluid pressure conduits, the combination with a casing and an obturating member rotatably mounted in said casing, of a relief valve operable to vent fluid under pressure from the conduit at one side of said member and having a stem extending into a bore of said member and free to move longitudinally in said bore, means for rotating said stem and valve with said member, a fixed plate carried by said casing and having a projection, and an element carried by and rotatable with said valve and having a projection adapted to engage the projection on said plate to unseat said valve upon rotation of said member.

FRANÇOIS LOUIS RENÉ REURE.
FRANÇOIS GABRIEL MARTIN.